(12) United States Patent
Har et al.

(10) Patent No.: US 7,282,946 B2
(45) Date of Patent: Oct. 16, 2007

(54) DELAY-INSENSITIVE DATA TRANSFER CIRCUIT USING CURRENT-MODE MULTIPLE-VALUED LOGIC

(75) Inventors: Dong-Soo Har, Gwangju (KR); Myeong-Hoon Oh, Jeollanam-do (KR)

(73) Assignee: Gwangju Institute of Science and Technology, Gwangju (KR)

( * ) Notice: Subject to any disclaimer, the term of this patent is extended or adjusted under 35 U.S.C. 154(b) by 349 days.

(21) Appl. No.: 11/025,458

(22) Filed: Dec. 29, 2004

(65) Prior Publication Data
US 2005/0200388 A1    Sep. 15, 2005

(30) Foreign Application Priority Data
Feb. 20, 2004   (KR)  ............... 10-2004-0011299

(51) Int. Cl.
*H03K 17/16*  (2006.01)
(52) U.S. Cl. ............... 326/21; 326/23; 326/83
(58) Field of Classification Search ............ 326/26, 326/27, 37–41, 82, 86; 327/100, 102
See application file for complete search history.

(56) References Cited

U.S. PATENT DOCUMENTS

| | | | | |
|---|---|---|---|---|
| 5,473,666 A * | 12/1995 | Szczebak et al. | ............... | 379/3 |
| 5,578,943 A * | 11/1996 | Sasaki | ............ | 326/86 |
| 5,578,944 A * | 11/1996 | Sasaki | ............ | 326/86 |
| 5,761,246 A * | 6/1998 | Cao et al. | ............ | 375/287 |
| 5,818,774 A * | 10/1998 | Haukness | ............ | 365/207 |
| 6,195,397 B1 | 2/2001 | Kwon | | |
| 6,466,347 B1 * | 10/2002 | Nagahori | ............ | 398/154 |
| 6,864,584 B2 * | 3/2005 | Hanaoka et al. | ............ | 257/762 |
| 7,120,818 B2 * | 10/2006 | Dietrich et al. | ............ | 713/600 |
| 2002/0060587 A1 * | 5/2002 | Kimball et al. | ............ | 327/108 |
| 2003/0107411 A1 * | 6/2003 | Martin et al. | ............ | 327/100 |
| 2006/0067440 A1 * | 3/2006 | Hsu et al. | ............ | 375/345 |

FOREIGN PATENT DOCUMENTS

KR     1998 083244     12/1998

* cited by examiner

*Primary Examiner*—Linh V. Nguyen
(74) *Attorney, Agent, or Firm*—Ladas & Parry LLP

(57) ABSTRACT

The present invention relates to a delay-insensitive DI data transfer circuit based on a current-mode multiple-valued logic for transferring data regardless of a delay time of transmission according to a length of wire.

The delay-insensitive data transfer circuit of the present invention, in a delay-insensitive data transfer circuit transferring an input request signal and a data signal from a data transmission unit to a data receiving unit, comprises: an encoder for outputting a signal which has been converted to current-level signals in response to voltage-level input of data signal and request signal from the data transmission unit; and a decoder for restoring the voltage-level signals from the current-level signals of the encoder, abstracting a data signal and a request signal from the restored voltage-level signals, and outputting the data signal and the request signal to the data receiving unit.

7 Claims, 11 Drawing Sheets

FIG. 2b (PRIOR ART)

| Meaning | (data.t, data.f) |
|---|---|
| space | (0,0) |
| Valid data '0' | (0,1) |
| Valid data '1' | (1,0) |
| Not used | (1,1) |

FIG. 3b (PRIOR ART)

| Meaning | (data3, data2, data1, data0) |
|---|---|
| space | (0,0,0,0) |
| Valid data '00' | (0,0,0,1) |
| Valid data '01' | (0,0,1,0) |
| Valid data '10' | (0,1,0,0) |
| Valid data '11' | (1,0,0,0) |
| Not used | Other signal value |

DELAY-INSENSITIVE DATA TRANSFER CIRCUIT USING CURRENT-MODE MULTIPLE-VALUED LOGIC

TECHNICAL FIELD

The present invention relates to a delay-insensitive data transfer circuit, and more particularly, to a delay-insensitive data transfer circuit using a current-mode multiple-valued logic circuit designing method capable of transferring data by representing a plurality of data on a wire.

BACKGROUND ART

As manufacturing techniques such as a processing technique and a designing technique of an integrated circuit are improve, a size of device has recently been minute. As a result, a system which used to be embodied under a board level now can be embodied in a chip, namely system-on-chip (SoC). However, as many devices are integrated in one chip, a chip size has gradually been enlarged and a wire has relatively been lengthened.

On the other hand, a synchronous designing method using a conventional global clock for designing a chip with high capacity, it is difficult to solve a problem of a timing closure due to a clock skew, jitter and a time delay of wire as clock speed increases. Furthermore, it has been reached to the limit to improve performance of the system due to the increase of power consumption occurred in an additional circuit for assigning a clock.

Therefore, a system design using an asynchronous designing method for overcoming a limitation of improving capability of a synchronous circuit and a problem of power consumption due to a clock driving has been studied widely.

The asynchronous designing method can be an alternative for solving those problems in the aspect of performing a data transmission by a handshake protocol, without using a global clock.

Moreover, as another alternative proposal, a globally asynchronous locally synchronous (GALS) system capable of using advantages of both the synchronous designing method and the asynchronous designing method is being studied recently.

In the case of designing a chip with high capacity by the asynchronous designing method including the GALS system, the handshake protocol is used to transfer data, and the bundled data method is the most general and the easiest way.

FIG. 1 is a timing diagram illustrating an embodiment of transferring one bit data according to the bundled data method using 4-phase handshake protocol.

As shown in FIG. 1, when a valid data value is stabilized in a data transmission unit, if a request signal req is generated, a data receiving unit senses the request signal req, and latches the valid data value, then transmits an acknowledge signal ack to the data transmission unit.

After then, when the request signal req is initialized with a logical value '0' in the data transmission unit, the acknowledge signal ack is also initialized in the data receiving unit, so that the succeeding data can be prepared in the data transmission unit.

During this, the data receiving unit senses the valid data when the request signal req becomes a logical value '1'. At that time, the valid data should already be stabilized. Therefore, it should be assumed that there needs to be a time interval between the data and the request signal req. Typically, variation of the request signal req is delayed by inserting a delay component in the request signal req wire.

However, a transmission method assuming a delay time, such as the bundled data protocol, is not proper for designing a chip with high capacity such as a system-on-chip. That is, it is possible to fix a timing assumption between the data signal data and the request signal req only after a routing process of a wire completes, and it is also necessary to insert a delay component for each of many data lines.

In other words, many wires are necessary for transferring data among a number of blocks, and it is impossible to estimate a delay time before the routing step for each of the wires. Accordingly, when the delay time of each wire is different, it causes remarkable increase of designing complexity.

Therefore, in order to solve the aforementioned problem, a data transmission method regardless of a delay time of wire is requested and a dual-rail encoding method and a 1-of-4 data encoding method as a data transmission method regardless of a delay time of wire have been studied.

It will briefly be described about the two aforementioned methods with reference to FIGS. 2 and 3 as follows.

FIG. 2 is an explanatory diagram illustrating one bit data transmission by the dual-rail data encoding method. FIG. 2a is a timing diagram and FIG. 2b is a data value definition table. Data is represented by physically using two wires for valid data '0' and '1'.

That is, as shown in the data definition table of FIG. 2b, by using two wires data.t, and data.f, when the data.f is '1', the valid data is '0', and when the data.t is '1', the valid data is '1'. Here, if one of the two wires is changed, it means a data arrival. During this, the data receiving unit generates the acknowledge signal ack.

Furthermore, there is a space state positioned between a current data and a succeeding data in order to represent the succeeding data. The space state is represented by '0' for all of the wires data.t and data.f. The data transmission unit confirms the acknowledge signal ack from the data receiving unit for preparing the succeeding data, and transfers the data to the space state.

FIG. 3 is an explanatory diagram illustrating two bits data transmission by the 1 of 4 data encoding method. FIG. 3a is a timing diagram and FIG. 3b is a data value definition table.

Different from the dual-rail data encoding method in FIG. 2, the data transmission method in FIG. 3 represents possible two bits data '00', '01', '10', '11' by changing state of one wire among the four wires.

That is, as described in FIG. 3b, for four wires data0, data1, data2, data3, when the data0 is a logical value '1', the valid data is '00' and when the data1 is a logical value '1', the valid data is '01' When the data 2 and data 3 are logical value '1', respectively, the valid data are '10' and '11', respectively. The 1 of 4 data transmission method also needs the space state as the dual-rail data encoding method and represents the space state when all the four wires are logical value '0'.

The data transmission methods aforementioned in FIGS. 2 and 3 do not need the acknowledge signal ack, and variation of data encoded in the space state means a data arrival. According to this, it can be possible to perform a stabilized data transmission regardless of a delay time of wire.

However, the data transmission methods physically need 2N+1 wires for transferring N bit data. It thereby causes remarkable increase of designing complexity due to wires. Especially, a cross talk has bad influence of dropping down a transmission speed under a deep-submicron DSM condition.

DISCLOSURE OF THE INVENTION

An object of the present invention is to provide a delay-insensitive data transfer circuit using a current-mode multiple-valued logic which supplies 4-phase handshake protocol of a delay time insensitive data transmission method which can transfer data regardless of a transmission delay time according to a length of wire, and can remarkably reduce the number of wires necessary to reduce a designing complexity due to increase of the number of wires, comparing with the conventional delay time insensitive data transmission method.

In order to achieve the above-described object of the invention, there is provided a delay-insensitive data transfer circuit using a current-mode multiple-valued logic which can improve capability and characteristics of power consumption comparing with the conventional data transmission method and can be embodied by encoding and decoding a current-mode multiple-valued logic.

BRIEF DESCRIPTION OF THE DRAWINGS

FIG. 2b is a data value definition table in the case of FIG. 2a;

FIG. 3b is a data value definition table in the case of FIG. 3a;

BEST MODE FOR CARRYING OUT THE INVENTION

Figure 1:
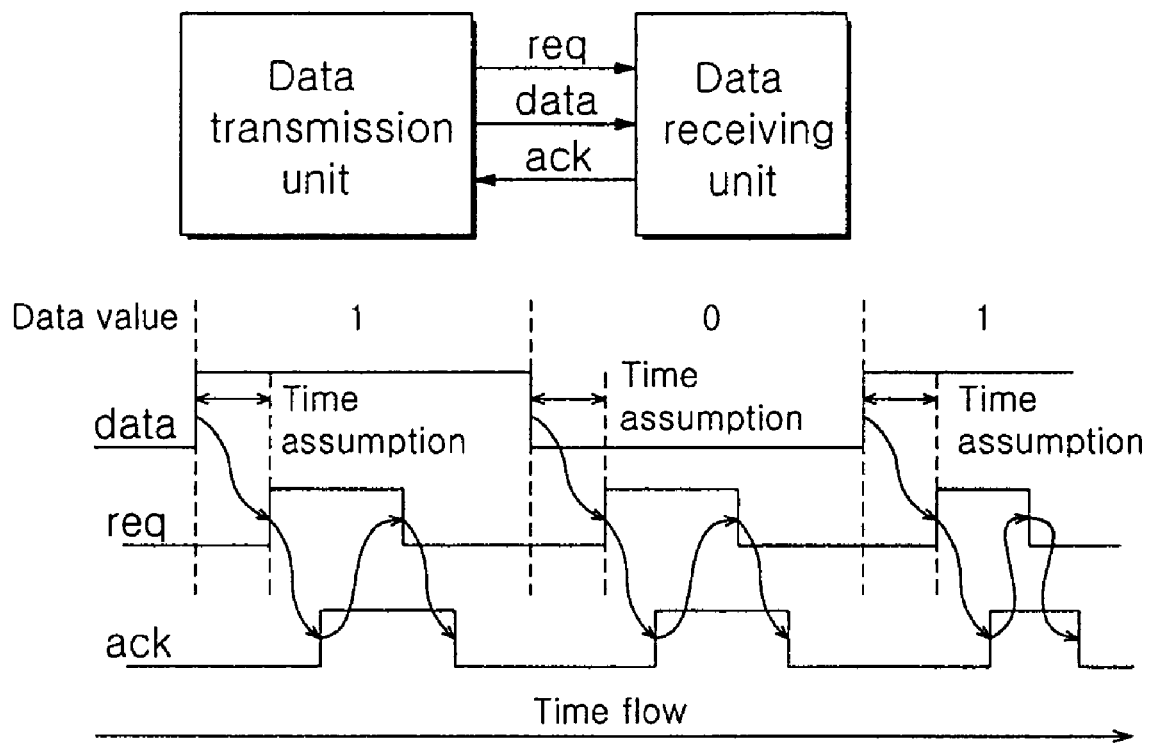
FIG. 1 is a timing diagram illustrating a data transmission method using a bundled data protocol.
Figure 2A:
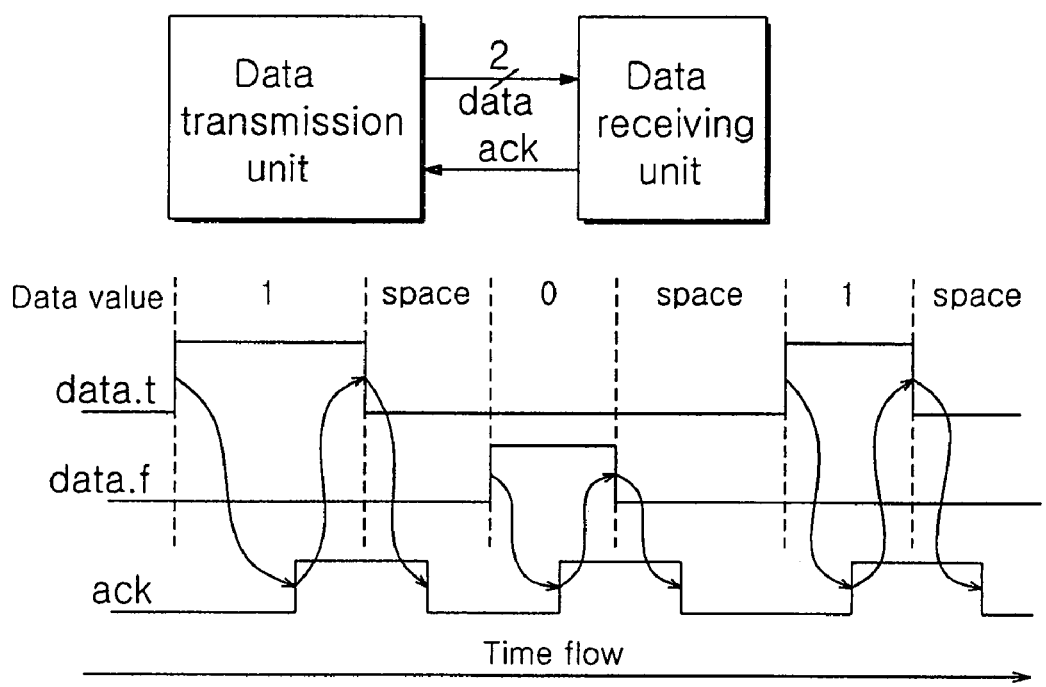
FIG. 2a is a timing diagram illustrating a delay-insensitive data transmission method using a dual-rail data encoding method.
Figure 3A:
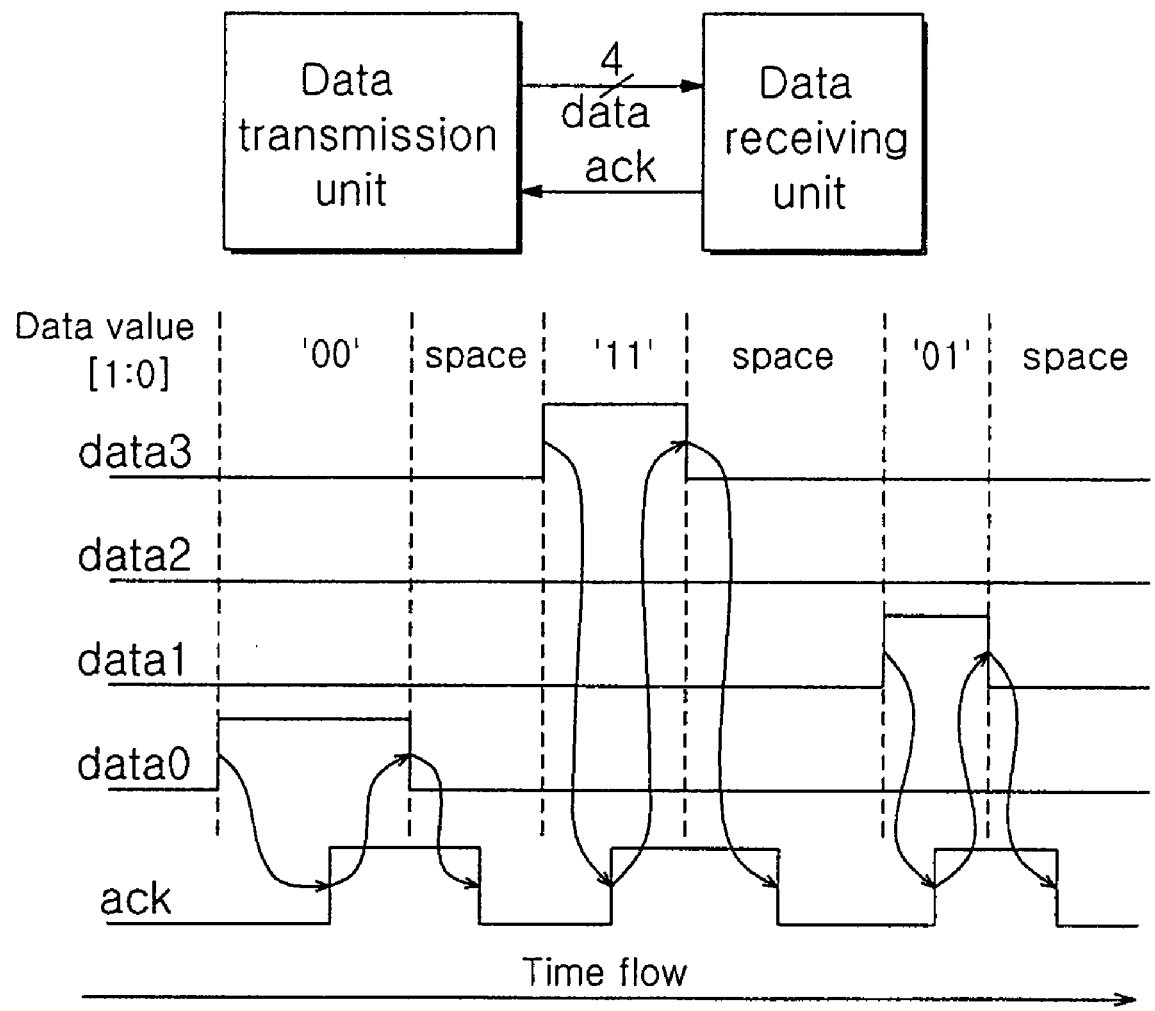
FIG. 3a is a timing diagram illustrating a delay-insensitive data transmission method using 1 of 4 data encoding method.

A delay-insensitive data transfer circuit using a current-mode multiple-valued logic in accordance with the present invention will now be described in detail with reference to the accompanying drawings.

The aforementioned object of the present invention, in a delay-insensitive data transfer circuit transferring an input request signal and a data signal from a data transmission unit to a data receiving unit, is achieved by the delay-insensitive data transfer circuit based on a current-mode multiple-valued logic which is comprised of: an encoder outputting a converted current-level signal in response to input of voltage-level data signal and request signal generated in the data transmission unit; and a decoder restoring the voltage-level signal from a current-level signal outputted from the encoder, abstracting a data signal and a request signal from the restored voltage-level signal, and thus outputting the signals to the data receiving unit.

The delay-insensitive data transfer circuit can transfer N-bit data signal and N-bit request signal by using N+1 wires by means of including an encoder coding binary data for voltage value between the data transmission unit and the data receiving unit to a current value, and a decoder restoring the binary voltage value from the current value containing data information.

Here, the encoder includes: a reference current source and a current mirror circuit for generating a reference current necessary for coding an input data; and a voltage/current conversion circuit converting input data of the voltage-mode to the current-mode.

Moreover, the decoder includes: a threshold current source and a threshold current mirror circuit for generating a threshold current necessary for detecting an input reference current; an input current mirror circuit which assigns the input current; and a current/voltage conversion circuit which restores the original input voltage value by using a voltage variation at each drain node of the two current mirror circuits.

Before explaining embodiments of the present invention, it will be described about a multiple-valued logic circuit as below.

First, the present invention employs the multiple-valued logic circuit for reducing the number of wires and maintaining stabilization of a transmission speed. Typically, the multiple-valued logic circuit is a mixed logic circuit using a binary logic and an analog signal processing. Accordingly, the multiple-valued logic circuit maintains advantage of the binary logic robust against noise and also takes advantage of the analog signal capable of processing much information.

Furthermore, the multiple-valued logic circuit can reduce the number of interconnection nodes of the whole system by transferring two bits signal or more via one signal line at the same time, and improve capability of the system by reducing the number of operating gates, transistors, and signal lines.

On the other hand, the multiple-valued logic circuit can be embodied by a voltage-mode method or a current-mode method according to the kinds of data to be represented. The multiple-valued logic circuit at the beginning was the voltage-mode method which sets levels between a voltage '0' and a supply voltage and distinguishes data according to the each level. However, under the condition that the supply voltage keeps decreasing during a circuit designing, the multiple-valued logic circuit using the voltage mode has bad noise margin characteristic.

Accordingly, the multiple-valued logic circuit has recently been using the current-mode, which sets levels and represents data by controlling current value. The current-mode method can embody a multiple-valued logic circuit robust against the noise margin because a designer can variously control the current value.

It will be described about the aforementioned objects, a technical configuration, and operating effects thereto in detail with reference to the accompanying drawings as follows.

As the present invention may be embodied in several forms without departing from the spirit or essential characteristics thereof, it should also be understood that the above-described embodiment is not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

Figure 4:
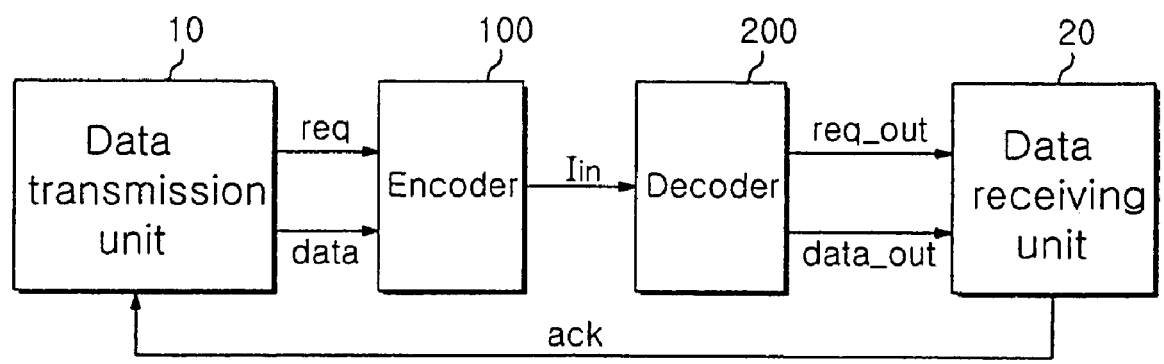
FIG. 4 is a block diagram illustrating a delay-insensitive data transfer circuit in accordance with an embodiment of the present invention.

FIG. 4 is a block diagram illustrating a delay-insensitive data transfer circuit in accordance with an embodiment of the present invention.

As shown in FIG. 4, the delay-insensitive data transfer circuit in accordance with the present invention is comprised of a data transmission unit 10, an encoder 100, a decoder 200, and a data-receiving unit 20.

The data transmission unit 10 transfers a request signal req and a data signal data.

The encoder 100 receives voltage-level data signal data and request signal req. In response to this, the encoder 100 outputs a current-level signal Iin converted from those voltage-level signals, and then operates a data transmission regardless of a delay time of wire.

The decoder 200 restores the voltage-level signal from the current-level signal In outputted from the encoder 100, and outputs a data signal data_out and a request signal req_out restored again from the restored voltage-level signals.

Further, the data receiving unit 20 transfers an response signal to the data transmission unit 10 in response to an input of the data signal data_out and the request signal req_out outputted from the decoder 200.

During procedures of transferring data, the N bit data transmission is operated with N+1 wires by representing 'data 1 transmission', 'data 0 transmission', and a space state according to three current levels. The circuits of the encoder 100 and decoder 200 are embodied by using a current-mode multiple-valued logic, and will be described with reference to FIG. 5 as follows.

Figure 5:
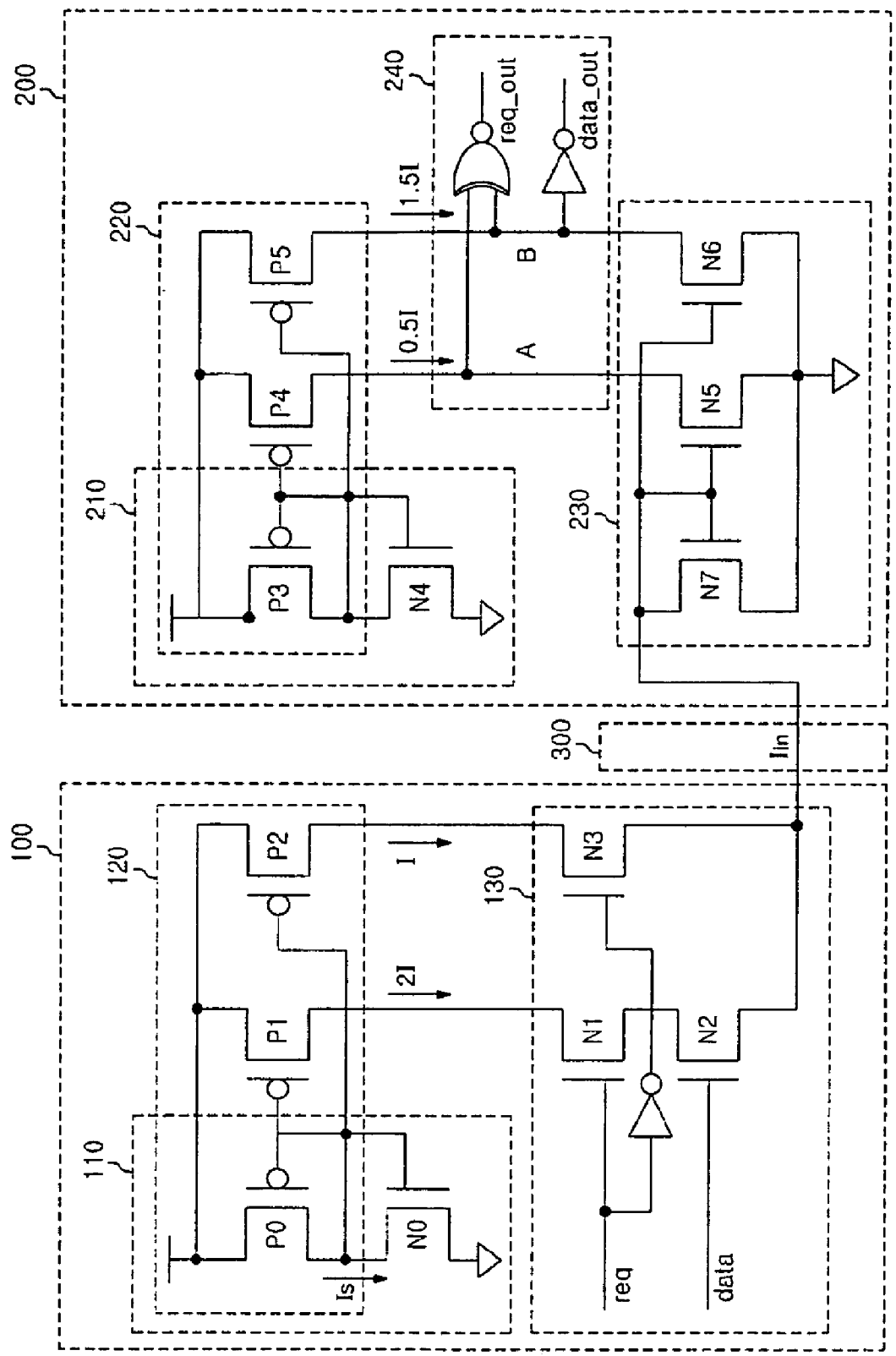
FIG. 5 is an explanatory diagram illustrating a delay-insensitive data transfer circuit in accordance with the present invention.

FIG. 5 is an explanatory diagram illustrating a delay-insensitive data transfer circuit in accordance with the present invention, which shows a preferred embodiment of the encoder 100 and the decoder 200 illustrated in FIG. 4.

Referring to FIG. 5, the embodiment shows the encoder circuit 100 for one bit data. The encoder circuit 100 is comprised of a reference current source 110, a reference current mirror circuit 120, and a voltage/current conversion circuit 130.

The reference current source 110 generates a constant-current Is, and the reference current mirror circuit 120 generates predetermined levels of reference currents 2I, I according to the level of the constant-current Is.

During this, the current source 110 and the current mirror circuit 120 operate as reference current generators.

Moreover, the voltage/current conversion circuit 130 selects the predetermined levels of reference currents 2I, I from the reference current mirror circuit 120, in response to an input of voltage levels of request signal req and data signal data inputted to the encoder.

On the other side, configuration and logic of each transistor included in the circuit may be embodied differently considering the circuit characteristics.

The encoder circuit 100 will now be described in detail as follows.

The current source 110 is comprised of P-type transistor P0 and N-type transistor N0, and plays a role as a current source to generate the constant-current Is.

A voltage between a drain and a source in the P0 and N0 comprising the current source 110 is the same with the voltage between a gate and the source. Accordingly, the current source 110 always operates in a saturation region, so that the predetermined level of constant-current Is flows in the drain as a common node.

Furthermore, the current mirror circuit 120 is comprised of P-type transistors P1, P2. When the constant-current Is is duplicated in the drain of each transistor comprising the current mirror circuit 120, the current mirror circuit 120 controls a current value flowing in each drain according to ratio of channel width to channel length of the transistors P1, P2, and thus respectively generates current-level reference currents 2I, I, which mean current levels.

After then, the voltage/current conversion circuit 130 is comprised of N-type transistors N1, N2, N3, and each N-type transistor combines the request signal req and the data signal data, which are input signals of the encoder 100 circuit, and selects the reference currents 2I, I from the current mirror circuit 120, and thus maps them with a specific current value.

Table 1 is showing the value mapping the combination of the request signal req and the data signal data, which are the input signals, to current values.

TABLE 1

| Request signal req | 0 | 1 | 1 |
|---|---|---|---|
| Data signal data | 0 or 1 | 0 | 1 |
| Reference current | I | 0I | 2I |
| (A, B) | (0, 1) | (1, 1) | (0, 0) |

In the above Table 1, in case that the request signal req is '1' in the 4-phase handshake protocol, the data value is valid. During this, when the data is '0', the data is assigned to the reference current 0I, and when the data is '1', the data is assigned to the reference current 2I. Further, the intermediate reference current value I is mapped to the request signal req '0' which is in a space state.

Referring to the voltage/current conversion circuit 130 of FIG. 5, when the request signal req is '0' according to each input signal value, the N-type transistor N3 is turned on and thus the current I of the drain of P-type transistor P2 is outputted at a port Iin, and the N-type transistor N1 is turned off and thus the current 2I of the drain of P-type transistor P1 is not outputted regardless of the state of the N-type transistor N2.

When the request signal req is '1' and the data signal data is '0', the N3 is turned off, so that the reference current I of the drain of P-type transistor P2 is not outputted. However, because the N1 is turned on but the N2 is turned off, the drain current 2I of the P-type transistor P2 is not outputted as well. As a result, the current 0 is outputted at the port Iin.

When the request signal req is '1' and the data signal data is '1', the N3 is turned off and the N1 and N2 are turned on, which leads to output the current 2I. The P1 must be designed twice larger than the P2 for generating a mapped current value. For this, the current value is adjusted by changing the channel width and the channel length of the transistors P1, P2.

On the other hand, the current generated from the aforementioned encoder circuit 100 is transferred to the decoder circuit 200 through a wire 300. As shown in FIG. 5, one bit data transmission is possible by just one wire regardless of a delay time of wire.

The decoder circuit 200 is comprised of a threshold current source 210, a threshold current mirror circuit 220, an input current mirror circuit 230, and a current/voltage conversion circuit 240.

The threshold current source 210 generates a constant-current, and the threshold current mirror circuit 220 generates predetermined levels of threshold currents 0.5I, 1.5I necessary for detecting an input reference current in response to the constant current level of the current source 210.

That is, the current source 210 and the threshold current mirror circuit 220 operate as reference current generators.

Moreover, the input current mirror circuit 230 differentiates the threshold currents 0.5I, 1.5I generated from the threshold current mirror circuit 220, in response to the level of the input current Iin inputted from the encoder 100.

The current/voltage conversion circuit for decoder 240 detects the differential threshold currents and then restores a input voltage value by the differential currents.

As the decoder circuit 200 is just an desirable embodiment, each transistor can be embodied with different configuration or different logic according to a circuit characteristic.

The aforementioned decoder circuit 200 will now be explained in detail.

Similarly to the encoder 100, the current source 210 and the threshold current mirror circuit 220 are comprised of transistors N4, P3, P4, P5.

Furthermore, an input current is applied to each drain of the N5 and N6, which are the input current mirror circuit 230, by a transistor N7 receiving the input current, and the input current mirror circuit 230 is connected with each drain of the P4 and P5. As a result, the input current mirror circuit 230 is operated as a current comparator circuit.

The input current mirror circuit 230 detects the input current level by using a differential currents between the input currents predetermined to be 0I, I, 2I and the threshold current generated from the P4 and P5. It is possible to restore the original voltage level value by using variation of voltages between nodes A and B according to difference between the input current and the threshold current. For this, the threshold current mirror circuit 220 of P4 and P5 should generate the threshold currents 0.5I and 1.5I.

On the other side, when the current 0I is inputted for the Iin, the drains of the transistors N5, N6 in the input current mirror circuit 230 do not pull the current, so that both the nodes A and B maintain a voltage logical value '1'.

Moreover, when the current 1I is inputted, the drain of the transistor N5 uses all of the threshold current 0.5I to pull the current 1I, so that the node A has a voltage logical value '0', but the node B has a voltage logical value '1' due to the differential current. Similarly, when the current 2I is inputted, both the nodes A and B have voltage logical values '0'.

It is advantageous to use the voltage values of the nodes A and B for abstracting an input of original voltage mode once again for each input reference current. The aforementioned Table 1 shows the values for the nodes A and B according to each reference current, and other output signals req_out, data_out for the values of the nodes A and B may be obtained as the following equation 1.

$$req\_out = AB + !A!B = XNOR(A, B)$$

$$data\_out = !B = INV(B) \qquad \text{[Equation 1]}$$

Using the equation 1, the current/voltage conversion circuit 240 restores input values of the original request signal req and original data signal data and then outputs them.

Figure 6:
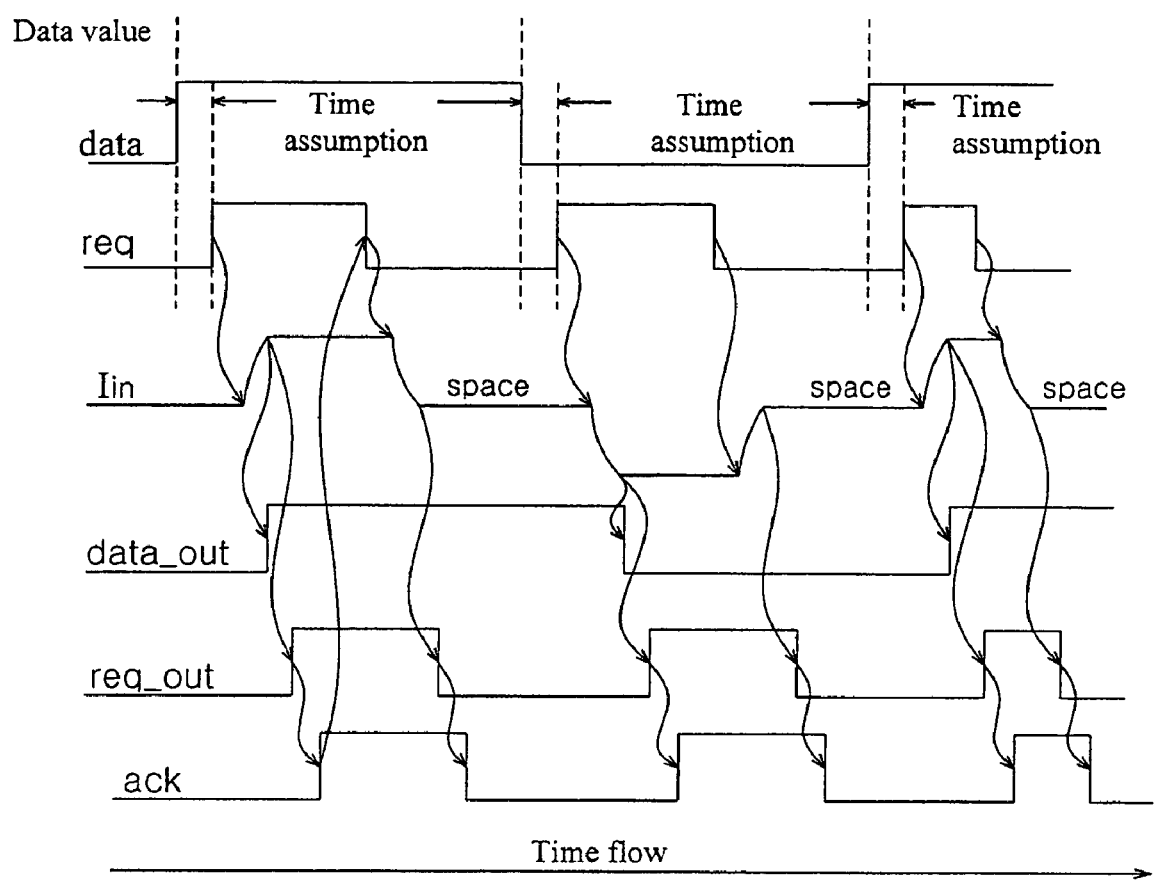
FIG. 6 is a timing diagram in accordance with a delay-insensitive data transmission method of the present invention.

Next, FIG. 6 is a timing diagram in accordance with a delay-insensitive data transmission method of the present invention.

Since the data transmission unit and the encoder, and the data receiving unit and the decoder are designed to be adjacently connected. As a result, a timing assumption between the data signal and the request signal of a bundled data protocol can be satisfied easily.

According to the request signal req and the data signal data from the data transmission unit 10, the encoder 100 outputs the current level 2I for data '1', the current level 0I for data '0', and the current level I for the space state by a receiver's acknowledge signal to the port Iin, by means of converting the request signal req and the data signal data to currents.

Moreover, the decoder 200 restores the original request signal req_out and data signal data_out according to each input current level and then transfers them to the data receiving unit 20.

As shown in FIG. 6, when transferring data in order, as '1', '0', '1', the state of the port Iin is changed in order, as data 1 transmission, data 0 transmission, space, data 1 transmission, and then space, same as the dual-rail encoding method or 1 of 4 data encoding method.

If current value necessary to restore data in the decoder 200 is detected regardless of the length of wires between the encoder 100 and the decoder 200, the data can be restored. As a result of this, it is possible to transfer a stabilized data regardless of a delay time of wire. Also, because wires are used as many as the number of transmission data bits as shown in FIGS. 4 and 6, it is possible to reduce the designing complexity due to increase of the number of wires in comparison with the conventional method.

Figure 7:
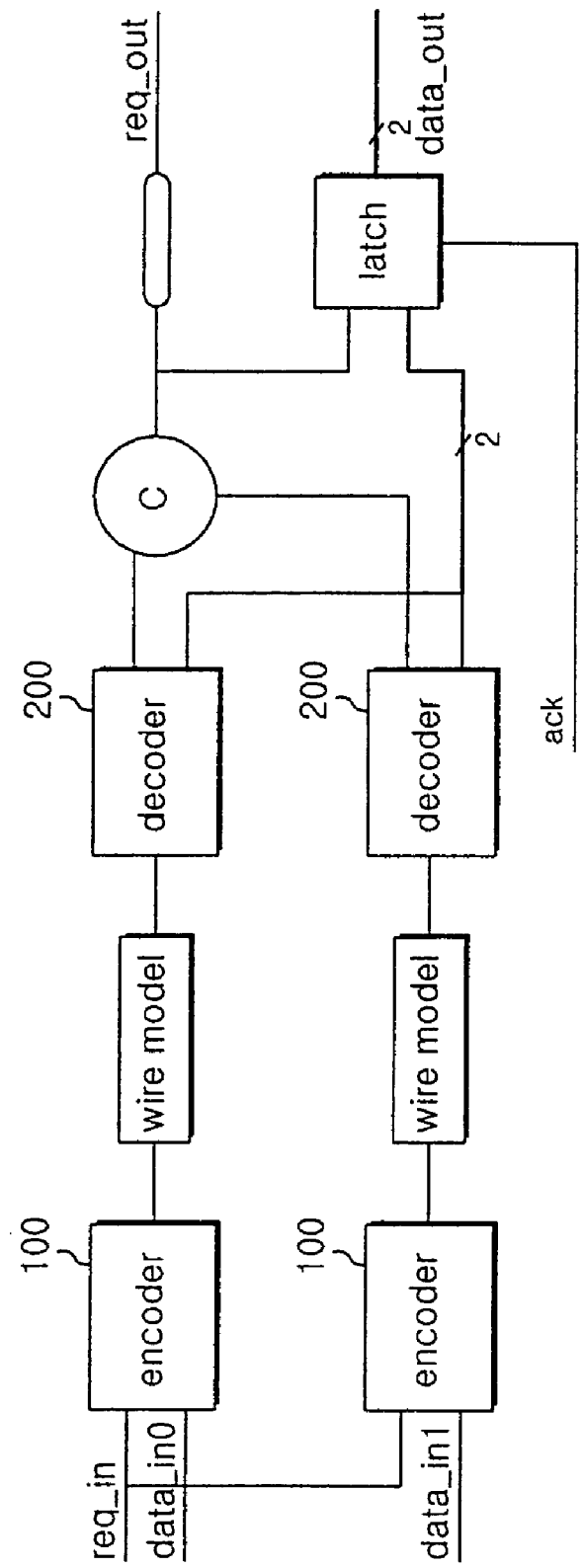
FIG. 7 is a block diagram illustrating a simulation for characteristics of a delay-insensitive data transfer circuit in accordance with the present invention.
Figure 8:
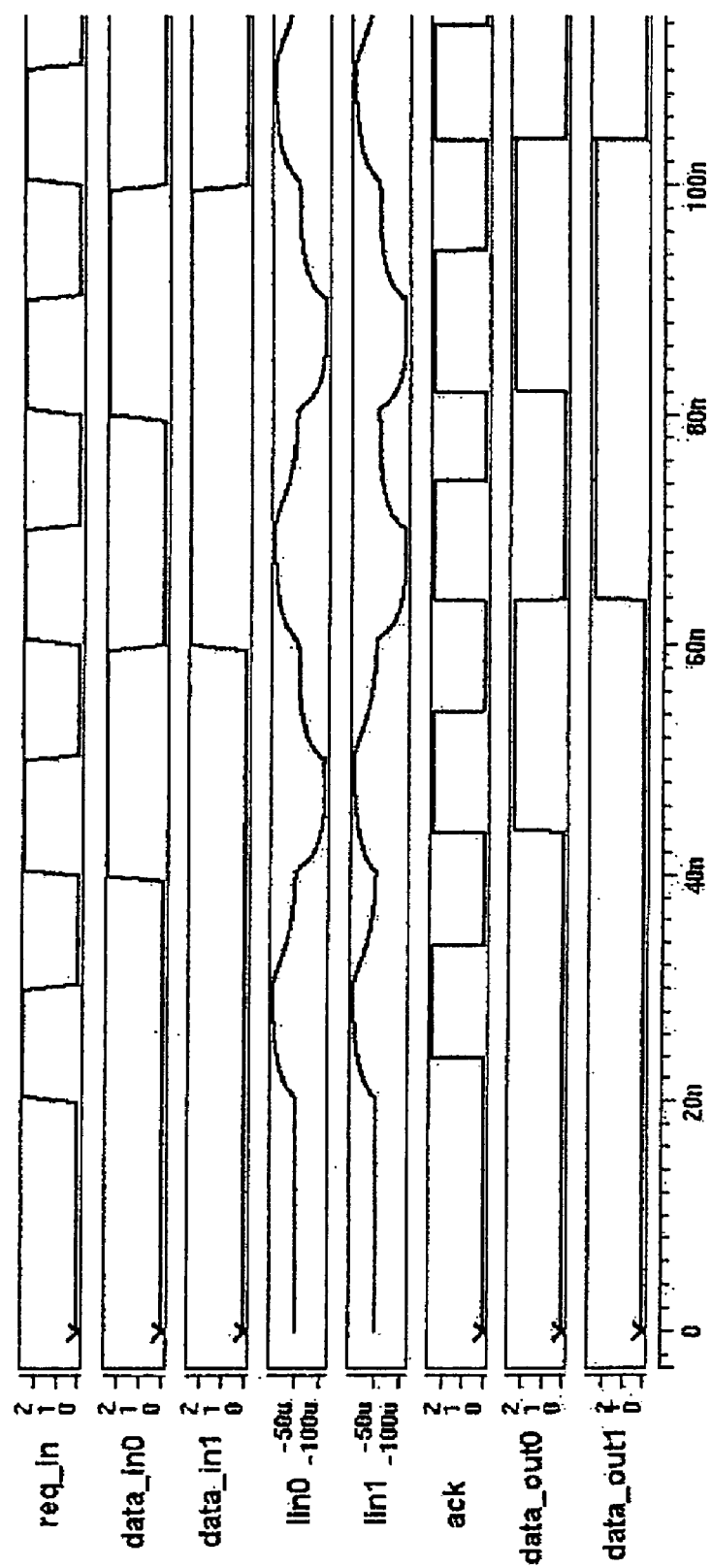
FIG. 8 is a result diagram of a simulation illustrating a delay-insensitive data transfer circuit of the present invention designed according to the block diagram of FIG. 7.

FIG. 7 is a block diagram illustrating a simulation for characteristics of a delay-insensitive data transfer circuit in accordance with the present invention, and FIG. 8 is a timing diagram illustrating a simulation result of a delay-insensitive data transfer circuit of the present invention designed according to the block diagram of FIG. 7.

Under the condition of FIG. 7, capability and power consumption of various lengths of wires are monitored at 0.25 um processing technique level, and average of delay time from an input data signal data_in to the restored data signal data_out is monitored by a HSPICE simulation.

Furthermore, a root mean square RMS power consumption is monitored by NanoSim tool. Is generated from current sources of each encoder 100 and decoder 200 for a low power consumption is maintained as low as possible, and the current mirrors of each encoder 100 and decoder 200 generate the reference currents I, 2I by rising the Is.

The delay-insensitive data transfer circuit according to the present invention uses 2V instead of 2.5V, because it performs a stabilized operation under a low power supply voltage from the initial state.

Confirming characteristics of FIG. 7 with reference to FIG. 8, 2 bits input data data_in0, data_in1 are converted to currents Iin0, Iin1, and the original data are restored in 2 bit data patterns, which can be used.

Figure 9:
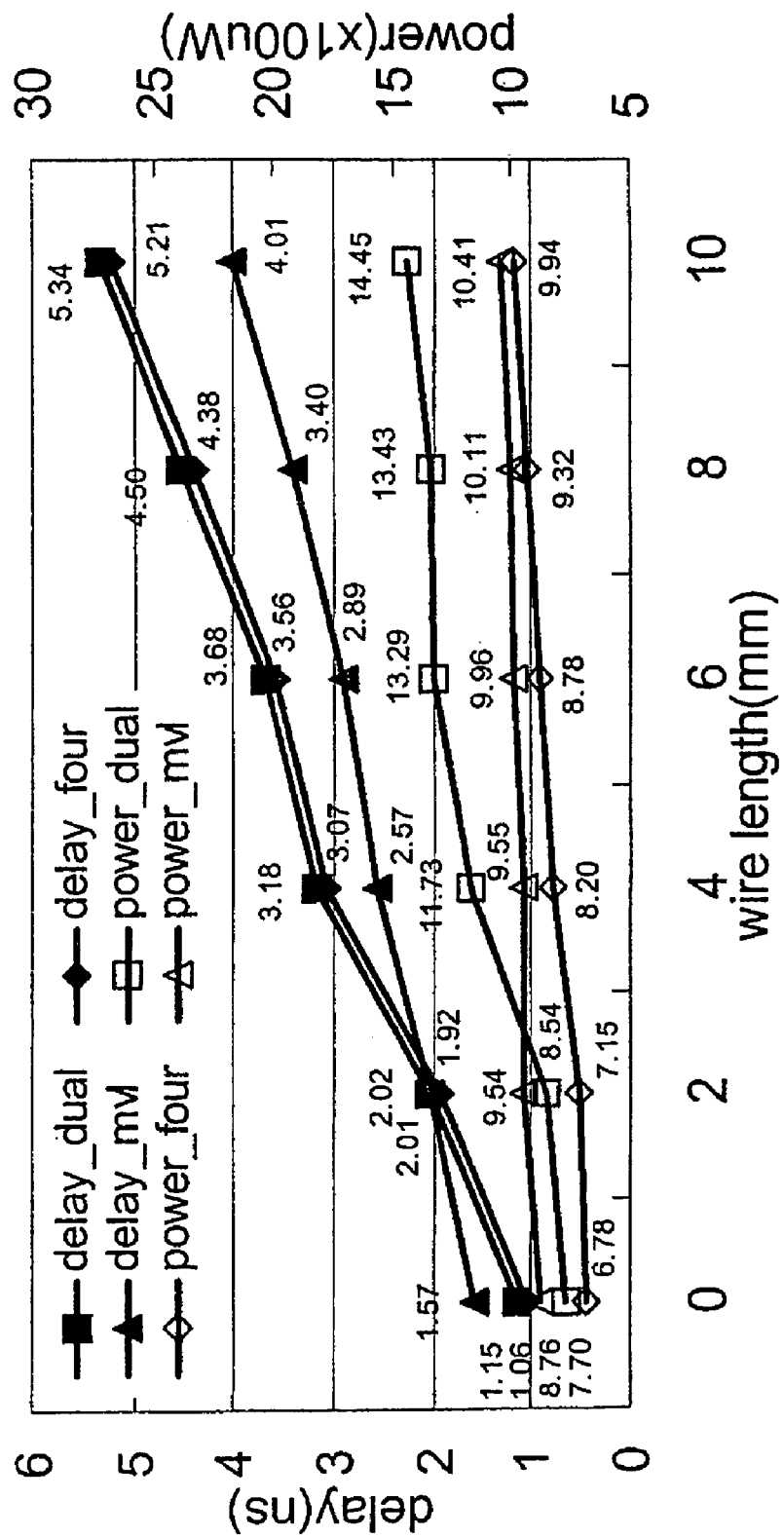
FIG. 9 is a result diagram of a simulation comparing characteristics of a delay-insensitive data transmission method in accordance with the present invention with characteristics of a delay time and power consumption in the conventional method according to a length of wire.

FIG. 9 is a result diagram of a simulation comparing characteristics of a delay time and power consumption of the delay-insensitive data transmission method in accordance with the present invention and the conventional method according to a length of wire.

FIG. 9 illustrates results of comparison of characteristics of a delay time delay_mvl and power consumption power_mvl in the delay-insensitive data transfer circuit using a multiple-valued logic according to the present invention with characteristics delay_dual, power_dual of the dual-rail data encoding method and with characteristics delay_four, power_four of the 1 of 4 data encoding method, in accordance with the length of wires, under the same simulation condition.

Particularly, it must be noticed that the number of wires necessary for the simulation conditions of the dual-rail data encoding method and the 1 of 4 data encoding method is twice more than the condition of 2 bit data having the structure as in FIG. 7.

As described in FIG. 9, the circuit using the multiple-valued logic according to the present invention has a considerable delay time capability more than the methods using 2 mm wires or longer ones. Additionally, if the wire is longer than 4 mm, the delay-insensitive data transfer circuit using the multiple-valued logic according to the present invention consumes a relatively lower power than the dual-rail data encoding method.

Still referring to FIG. 9, the delay-insensitive data transfer circuit using the multiple-valued logic according to the present invention has better characteristics in the delay time and a low power, comparing with other methods using wires over 4 mm.

As described above, although the present invention has been described in connection with the embodiment of the present invention illustrated in the accompanying drawings, it is not limited thereto. It will be apparent to those skilled in the art that various substitution, modifications and changes may be thereto without departing from the scope and spirit of the invention.

INDUSTRIAL APPLICABILITY

As described above, the delay-insensitive data transfer circuit using the current-mode multiple-valued logic according to the present invention performs a communication between a data transmission unit and a data receiving unit by using a delay time insensitive data transmission method supporting 4-phase handshake protocol. In response to this, the delay-insensitive data transfer circuit can transfer data safely regardless of the length of wire. Additionally, when N-bit data is transferred, it can reduce designing complexity due to increase of the number of wires in designing a system-on-chip with high capacity because it can be embodied with N+1 wires, while the conventional method uses 2N+1 wires.

Furthermore, due to reduction of the number of wires, the present invention can remarkably be advantageous in terms of the decrease of power consumption and a cross talk due to a coupling effect of wires.

What is claimed is:

1. A delay-insensitive data transfer circuit based on current-mode multiple-valued logic transferring an input request signal and a data signal from a data transmission unit to a data receiving unit, comprising:

an encoder having a reference current source and a reference current mirror circuit for generating reference currents of predetermined levels and a voltage/current conversion circuit which selects the reference currents of predetermined levels from the reference current mirror circuit, in response to an input of a voltage-level request signal and data signal; and a decoder for restoring the voltage-level signals from the current-level signals of the encoder, abstracting a data signal and a request signal from the restored voltage-level signals, and outputting the data signal and the request signal to the data receiving unit.

2. The circuit of claim 1, wherein the reference current mirror circuit comprises more than one MOS transistor for generating the first level reference current and the second level reference current which are different from each other on the basis of the current value from the reference current source.

3. The circuit of claim 2, wherein channel width and channel length of each MOS transistor are set so that the first level reference current can have a current level twice as high as one of the second level reference current.

4. The circuit of claim 2, wherein the voltage/current conversion circuit comprises more than one MOS transistor which maps the first and the second level reference currents generated from the reference current mirror circuit according to combination of the request signal and the data signal inputted to the encoder, and outputs the first reference level and the second reference level current values.

5. The circuit of claim 1, wherein the decoder comprises:

a threshold current source and a threshold current mirror circuit for generating threshold current of a predetermined level of necessary for detecting an input reference current;

an input current mirror circuit for decoder for differentiating the threshold current generated from the threshold current source and the threshold current mirror circuit, in response to a level of the input current inputted from the encoder; and a current/voltage conversion circuit for detecting the differentiated threshold current, and restoring a voltage input value according to the differential current.

6. The circuit of claim 5, the threshold current mirror circuit comprises more than one MOS transistor outputting different level values of generated current, in order to detect a current-level signal generated in the reference current mirror circuit.

7. The circuit of claim 1, wherein the data transfer circuit transfers a signal by using wires as many as the number of transmission data bits.

* * * * *